(12) United States Patent
Demangone et al.

(10) Patent No.: US 6,309,111 B1
(45) Date of Patent: Oct. 30, 2001

(54) SYSTEM AND METHOD FOR LIMITING PROTRUSION OF A FIBER-OPTIC CABLE FROM A MOUNTING STRUCTURE

(75) Inventors: Drew A. Demangone, Latrobe; Brian S. Trostle, York Springs, both of PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 09/364,441

(22) Filed: Jul. 30, 1999

(51) Int. Cl.[7] .................................................. G02B 6/38
(52) U.S. Cl. ................................................ 385/55; 385/75
(58) Field of Search ...................... 385/53–75, 134–139, 385/49; 439/545, 547, 554, 564

(56) References Cited

U.S. PATENT DOCUMENTS

| | | | |
|---|---|---|---|
| 4,272,141 | 6/1981 | McKeen et al. | 339/18 R |
| 4,432,604 | 2/1984 | Schwab | 350/96.21 |
| 4,845,592 | 7/1989 | Himes, Jr. et al. | 361/407 |
| 4,863,232 | 9/1989 | Kwa | 350/96.2 |
| 5,142,597 * | 8/1992 | Mulholland et al. | 385/56 |
| 5,261,827 | 11/1993 | Lenzi et al. | 439/78 |
| 5,285,007 | 2/1994 | Deluca et al. | 174/35 R |
| 5,530,783 | 6/1996 | Belopolsky et al. | 385/53 |
| 5,548,676 | 8/1996 | Savage, Jr. | 385/92 |

* cited by examiner

*Primary Examiner*—Akm E. Ullah
*Assistant Examiner*—Michelle R. Connelly-Cushwa
(74) *Attorney, Agent, or Firm*—Woodcock Washburn Kurtz Mackiewicz & Norris LLP

(57) ABSTRACT

A system for minimizing a protrusion of a fiber-optic cable from a mounting structure comprises a fiber-optic connector, an adapter for a fiber-optic connector, and a standoff The standoff positions the adapter and the connector at a fixed distance from a front surface of the mounting structure. A fiber-optic cable is routed from the connector through a penetration extending between the front and the rear surfaces of the mounting structure. The standoff has a minimum length that ensures that the connector does not protrude from the rear surface of the mounting structure. This arrangement allows a curvature to be imposed on the cable as it exits the rear surface. By imposing a curvature equal to the minimum bending radius of the cable, and extending this curvature through an arc of 90 degrees, a protrusion of the cable in a direction normal to the rear surface can be limited to the minimum bending radius of the cable.

12 Claims, 4 Drawing Sheets

SYSTEM AND METHOD FOR LIMITING PROTRUSION OF A FIBER-OPTIC CABLE FROM A MOUNTING STRUCTURE

BACKGROUND OF THE INVENTION

Minimal external dimensions are considered a desirable characteristic in many contemporary electronic devices. One commonly-used approach to achieving such minimization involves increasing the density in which the internal components of the device are packaged, i.e., placing the internal components in closer proximity to adjacent components and structures within the device.

Increases in component-packaging density typically necessitate a corresponding reduction in the area occupied by the wiring or cabling that interconnects the components. Such reductions are particularly difficult to achieve with fiber-optic cabling. These difficulties arise from the need to avoid any sharp bends in fiber-optic cables. More specifically, a fiber-optic cable cannot be routed in a manner that imposes a curvature which exceeds the minimum bending radius of the cable. Violation of this limit may impair the integrity of the signal transmission, and can damage the cable.

Fiber-optic cables are often joined through the use of adapters. More particularly, adapters are used to support and couple two or more fiber-optic connectors, thereby forming a junction between the cables attached to the connectors. The adapter is frequently disposed on some type of mounting structure, e.g., a backplane. Adapters that are disposed in this manner are commonly known as "backplane adapters." Backplane adapters are typically mounted in a manner that causes the adapter (and the corresponding connectors) to protrude from both sides of the mounting structure.

FIG. 1 illustrates a backplane adapter 10 installed on a backplane 11 in the above-noted manner. A first connector 12 and second connector 13 are disposed within the adapter 12. A fiber-optic cable 14 and a fiber-optic cable 15 are attached to the connectors 12 and 13, respectively. The cable 14 has a minimum bending radius 16 and the connector 12 has a length 17. The adapter 10 straddles the backplane 11, thereby causing the connector 12 and the cable 14 to protrude from a rear surface 11a of the backplane 11. More specifically, the connector 12 and the cable 14 protrude in a direction normal to the surface 11a by a distance 18.

A curvature is imposed on the cable 14 as it exits the connector 12. The curvature equals the minimum bending radius 16, and extends through an arc of about 90 degrees. Hence, the protrusion distance 18 is equal to the connector length 17 plus the minimum bending radius 16. Reducing the protrusion distance 18, without decreasing the connector length 17, would require imposing a curvature on the cable 14 that exceeds the minimum bending radius 16. Hence, the noted value represents the lowest level to which the protrusion distance 18 can be reduced using this particular mounting configuration.

The cable 14 is shown in FIG. 1 as being routed between the backplane surface 11a and an adjacent structure 19, e.g., a panel of the electronic device in which the backplane 11 resides, or another circuit substrate. As is evident from the figure, the protrusion distance 18 represents the minimum required clearance between the backplane 11 and the structure 19. Hence, any reduction in the protrusion distance 18 will allow the backplane 11 to be positioned closer to other components such as the exemplary structure 19. Reducing the spacing requirements for the backplane 11 will facilitate increased component-packaging densities in electronic devices in which the backplane 11 is utilized. The present invention seeks to achieve this goal.

SUMMARY OF THE INVENTION

The present invention is used in conjunction with a fiber-optic cable being routed from a mounting structure. The invention provides a system and a method for minimizing a protrusion of the cable from the mounting structure. More particularly, the invention allows the cable protrusion distance to be approximately, or less than, the minimum bending radius of the cable. This relatively short cable protrusion distance is achieved without compromising the structural and functional integrity of the cable. The invention can be used to minimize the required spacing between the mounting structure and another structure located adjacent to the mounting structure.

The system comprises a fiber-optic connector, an adapter for a fiber-optic connector, and a standoff. The connector is supported and retained by the adapter. The adapter is coupled to an end of the standoff. An opposite end of the standoff is coupled to a mounting surface on the mounting structure. The standoff thus positions the adapter and the connector at a fixed distance from the mounting surface. In the exemplary embodiment, the standoff comprises two column-like supports and the mounting surface is a front surface of a backplane. A fiber-optic cable is fixed to the connector. The cable is routed from the connector through a penetration that extends between the front and rear surfaces of the backplane. The cable thus protrudes from the rear surface of the backplane. The system mates with a second fiber-optic connector for transmitting signals therebetween.

The length of the standoff determines the positions of the adapter and the connector in relation to the rear surface of the backplane. The standoff could have a length chosen so as to ensure that the connector does not protrude from the backplane rear surface. A curvature can thus be imposed on the cable as it exits the rear surface. By imposing a curvature equal to the minimum bending radius of the cable, and extending this curvature through an arc of 90 degrees, the protrusion of the cable in a direction normal to the rear surface can be minimized. Specifically, the protrusion distance can be approximately, or less than, the minimum bending radius of the cable. This value represents the lowest level to which the cable protrusion can be reduced without compromising the structural and functional integrity of the cable. Minimizing the cable protrusion in this manner minimizes the required clearance between the backplane rear surface and an adjacent structure.

BRIEF DESCRIPTION OF THE DRAWINGS

The foregoing summary, as well as the following detailed description of the preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF THE PREFERRED EMBODIMENTS

Figure 1:
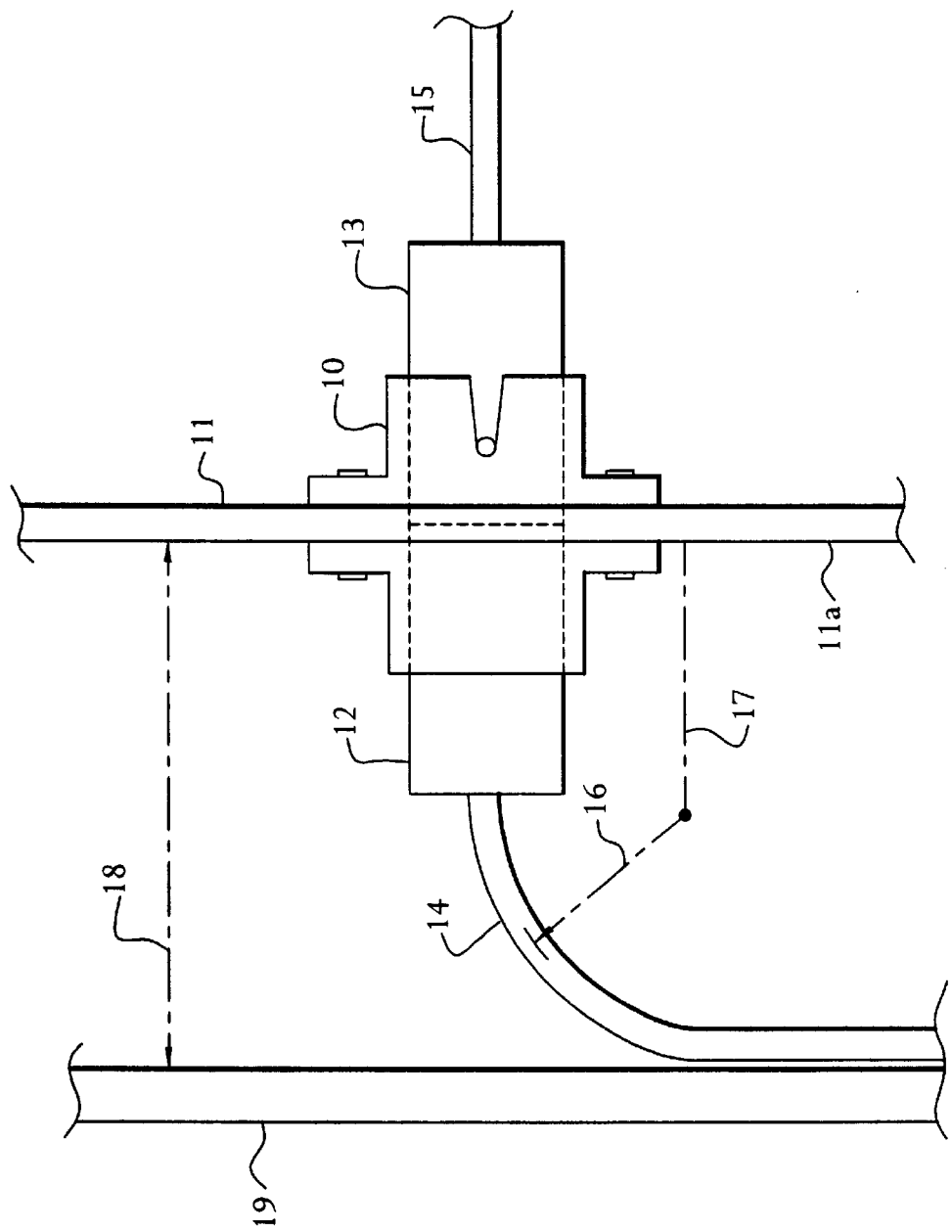
FIG. 1 is a side view of an adapter for a fiber-optic connector mounted on a backplane in accordance with the prior-art methodology.
Figure 2:
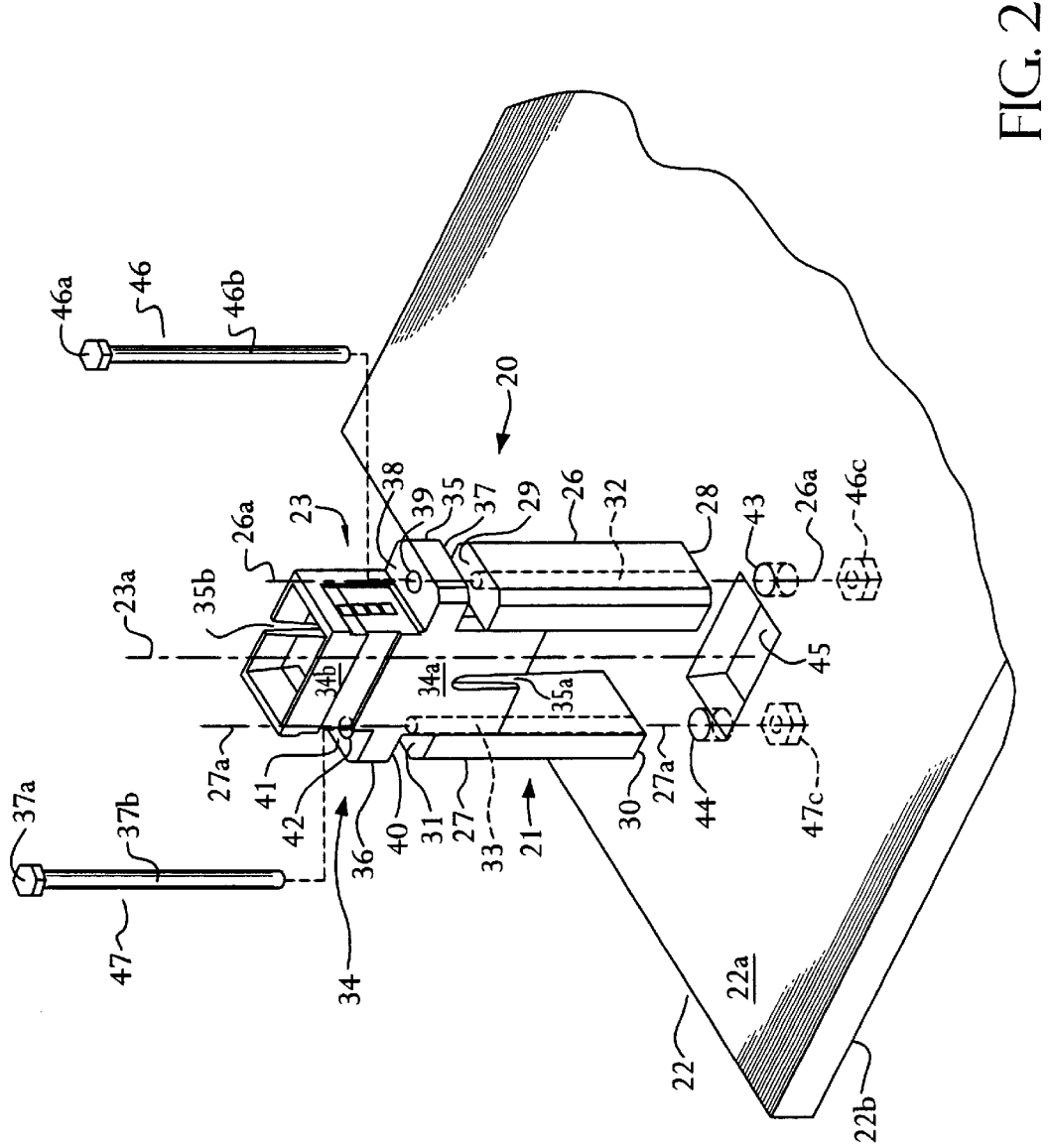
FIG. 2 is a perspective view of a system for minimizing a protrusion of a fiber-optic cable in accordance with the present invention.
Figure 3:
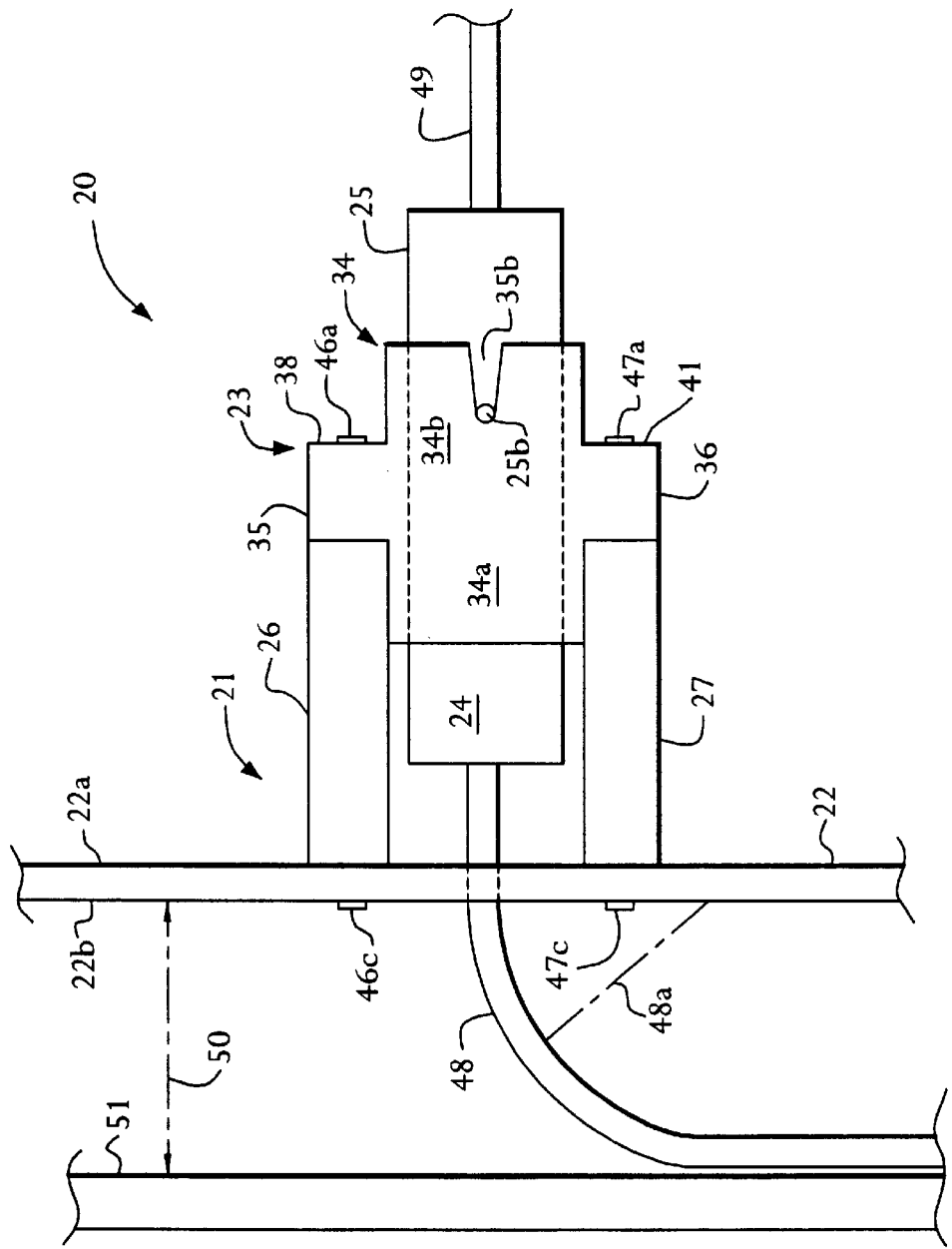
FIG. 3 is a side view of the system of FIG. 2.
Figure 4:
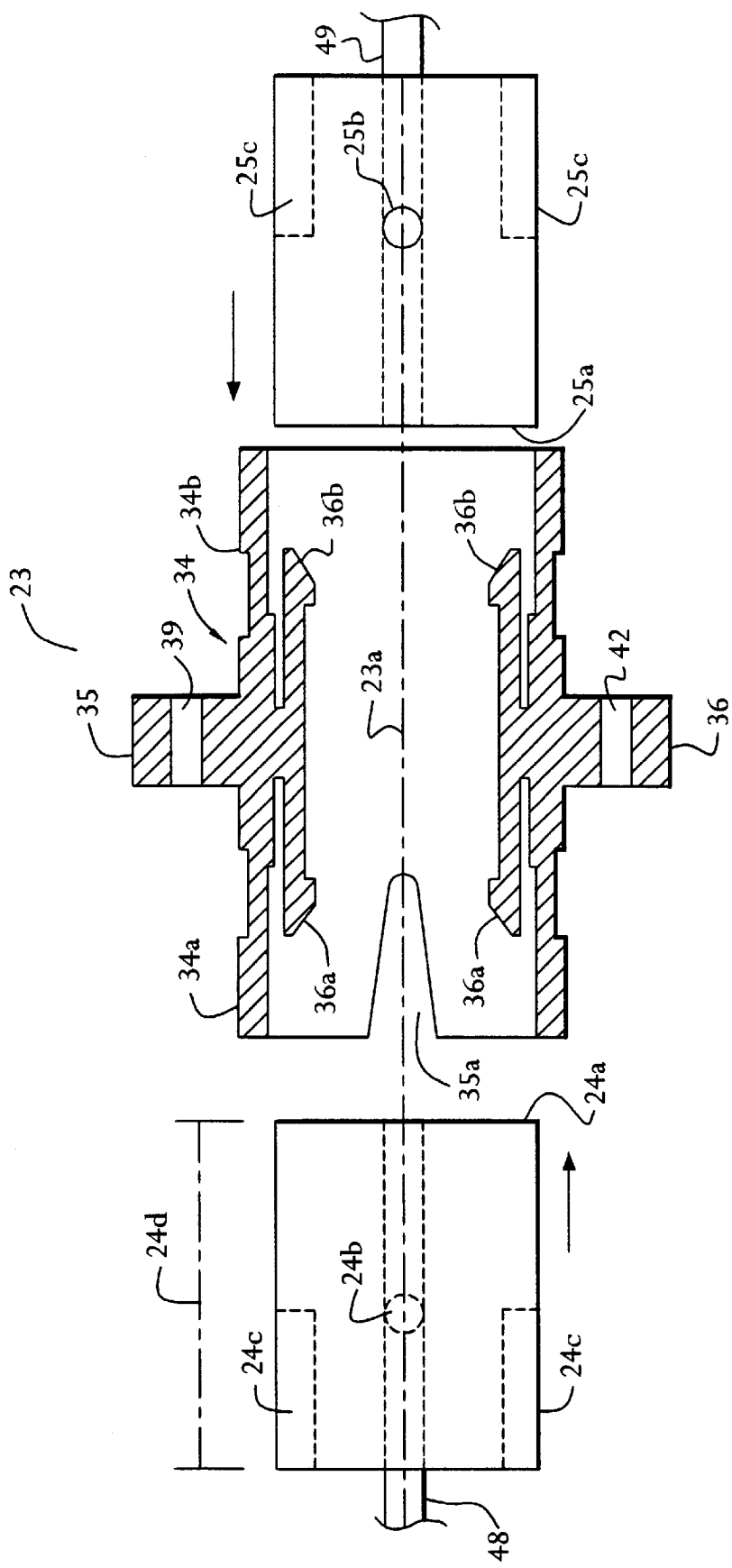
FIG. 4 is a cross-sectional view of an adapter for use in the system of FIG. 2.

A preferred embodiment of the invention is illustrated in FIGS. 2 through 4. The embodiment comprises a mounting system 20. The system 20 comprises a standoff 21 and an adapter for a fiber-optic connector. The standoff 21 is coupled to and supported by a mounting structure. In the described embodiment, the mounting structure is a backplane 22 and the adapter is a backplane adapter 23. The adapter 23 retains and couples a first fiberoptic connector 24 and a second fiber-optic connector 25.

The adapter 23 is coupled to the standoff 21 using, for example, a suitable fastener. Alternatively, the adapter 23 and the standoff 21 may incorporate latches that secure the adapter 23 to the standoff 21. In another alternative embodiment, the adapter 23 and the standoff 21 can be unitarily formed. The standoff 21 suspends the adapter 23 at a fixed distance from a front surface 22a of the backplane 22. The standoff 21 could comprise a first support 26 and a second support 27. The supports 26 and 27 are substantially identical. The first support 26 and the second support 27 define a longitudinal axis 26a and a longitudinal axis 27a, respectively.

The first support 26 comprises a first abutment surface 28 and a second abutment surface 29. The abutment surfaces 28 and 29 are substantially planar, and are disposed at opposite ends of the support 26. Furthermore, the surfaces 28 and 29 lie substantially perpendicular to the longitudinal axis 26a (hence, the surfaces 28 and 29 are substantially parallel in relation to each other). The second support 27 likewise comprises a first abutment surface 30 and a second abutment surface 31. The surfaces 30 and 31 are substantially planar. The surfaces 30 and 31 are disposed at opposite ends of the support 27, and lie substantially perpendicular to the longitudinal axis 27a. The surfaces 28 and 30 are each coupled to the front surface 22a of the backplane 22. Thus, the longitudinal axes 26a and 27a are substantially perpendicular to the surface 22a of the backplane 22.

The supports 26 and 27 preferably have a substantially rectangular cross-section. In the exemplary embodiment, the outer longitudinally-oriented edges of the supports 26 and 27 are tapered to conform to the shape of the adapter 23. This feature is evident in FIG. 2. Although this particular configuration is preferred, other geometric cross-sections, e.g., circular, square, etc., are within the contemplated scope of the invention. An optimal length, i.e., longitudinal dimension, for the supports 26 and 27 is discussed below.

The support 26 has a through hole 32 (shown in phantom in FIG. 2). The through hole 32 extends between the abutment surfaces 28 and 29, and parallels the longitudinal axis 26a. The support 27 likewise has a through hole 33 (also shown in phantom in FIG. 2). The through hole 33 extends between the abutment surfaces 30 and 31, and parallels the longitudinal axis 27a. The through holes 32 and 33 preferably have a circular cross-section. The significance of the through holes 32 and 33 is discussed below.

Details concerning one type of adapter 23 usable with the present invention follow. An exemplary adapter 23 is a backplane adapter for a fiber-optic connector. A suitable adapter may be obtained, for example, from FCI—Berg Electronics, Inc. as part no. 74809-001. The adapter 23 comprises a body 34, a first mounting wing 35, and a second mounting wing 36. The adapter 23 defines a longitudinal axis 23a that passes through the geometric center of the body 34, as shown in the figures.

The body 34 comprises a first housing 34a and a second housing 34b. The housings 34a and 34b are substantially identical. Preferably, the housings 34a and 34b are unitarily formed. The connectors 24 and 25 are partially disposed within the first and the second housings 34a and 34b, respectively, as shown in FIG. 3. The inner dimensions of the housings 34a and 34b are approximately equal to the outer dimensions of the connectors 24 and 25. Insertion of the connectors 24 and 25 into the housings 34a and 34b thus fixes the positions of the connectors 24 and 25. More particularly, the housings 34a and 34b guide a mating surface 24a on the connector 24 into contact with a mating surface 25a on the connector 25. Furthermore, the housings 34a and 34b cause the optical axes of the connectors 24 and 25 to substantially align, thereby establishing a fiber-optic connection.

The housings 34a and 34b define a polarizing slot 35a and a polarizing slot 35b, respectively. The connectors 24 and 25 comprise a tab 24b and a tab 25b, respectively. The tabs 24b and 25b are disposed along a side of the connectors 24 and 25, as shown in the figures. The tab 24b slidably engages the slot 35a as the connector 24 is inserted into the housing 34a. The tab 25b likewise engages the slot 35b as the connector 25 is inserted into the housing 34b. The protrusion of the tab 24b from the connector 24 prevents the connector 24 from being inserted when the tab 24b is not aligned with the corresponding slot 35a. The tab 25b similarly prevents the insertion of the connector 25 when the tab 25b and the slot 35a are not aligned. This arrangement ensures that the connectors 24 and 25 are correctly polarized i.e., that the multiple fiber-optic strands within the connectors 24 and 25 are properly oriented.

The housings 34a and 35a also perform the function of retaining the connectors 24 and 25 in pre-determined positions. The retaining function is accomplished by a pair of beam latches 36a and a pair of beam latches 36b disposed within the housings 34a and 34b, respectively. Insertion of the connectors 24 and 25 into the housings 34a and 34b forces the beam latches 36a and 36b to deflect outward, i.e., toward the side of the housings 34a and 34b. A pair of detents 24c and a pair of detents 25c are disposed along the sides of the connectors 24 and 25, respectively. The detents 24c and 25c are positioned such that the latches 36a and 36b resiliently engage the detents 24c and 25c, respectively, when the connectors 24 and 25 have been fully inserted into the housings 34a and 34b. Engagement of the passive latches 36a and 36b and the detents 24c and 25c prevents movement of the connectors 24 and 25 in a direction opposite the direction of insertion, thereby retaining the connectors 24 and 25 in place.

The mounting wings 35 and 36 of the adapter 23 are substantially identical, and are disposed on opposite sides of the adapter body 34. The mounting wing 35 comprises an abutment surface 37 and a second surface 38. The surfaces 37 and 38 are substantially planar. The surfaces 37 and 38 are disposed in a substantially perpendicular orientation in relation to the longitudinal axis 23a of the adapter 23. The abutment surface 37 is coupled to the second abutment surface 29 of the first support 26. The second surface 38 thus faces upward, i.e., away from the backplane 22. The mounting wing 35 has a through hole 39 extending between the surfaces 37 and 38. The through hole 39 is substantially aligned with the through hole 32 of the first support 26.

The mounting wing 36 likewise comprises an abutment surface 40 and a second surface 41. The abutment surface 40 is coupled to the second abutment surface 31 of the second support 27. The surfaces 40 and 41 are substantially parallel, and lie substantially perpendicular to the longitudinal axis 23a. The mounting wing 36 has a through hole 42 extending between the surfaces 40 and 41. The through hole 42 is substantially aligned with the through hole 33 in the second support 27. (The described mating configuration between the adapter 23 and the supports 26 and 27 is a preferred methodology. Other configurations, such as fixing the adapter 23 to a side of the supports 26 or 27, or forgoing the use of a second support, are within the contemplated scope of the invention.)

The backplane 22 comprises a rear surface 22b. In the exemplary embodiment, the backplane 22 has a through hole 43 and a through hole 44. The backplane 22 also has a penetration 45. The through holes 43 and 44 and the penetration 45 each extend between the front surface 22a and the rear surface 22b of the backplane 22.

In the past, the adapter 23 would rest within the aperture 45, and the holes 39 and 42 on the wings 35 and 36 would align with the through holes 43 and 44 in the backplane 22. In the present invention, however, the through hole 43 is substantially aligned with the through hole 42 of the first support 26, and with the through hole 39 of the adapter 23. The through hole 44 is substantially aligned with the through hole 43 of the second support 27, and with the through hole 42 of the adapter 23. The penetration 45 is disposed between the through holes 43 and 44, and is substantially aligned with the connectors 24 and 25. As shown in FIG. 3, the connector 24 extends through the aperture 45 to engage the adapter 23.

The adapter 23, supports 26 and 27, and backplane 22 are preferably coupled through the use of a first fastener 46 and a second fastener 47. The fasteners 46 and 47 are substantially identical. The first fastener 46 may be a nut and bolt, and may comprise a first retaining member 46a, a shaft 46b, and a second retaining member 46c (member 46c is illustrated in phantom in FIG. 2). At least a portion of the shaft 46b is disposed within the through holes 32, 39, and 43. The first retaining member 46a is disposed on the top surface 38 of the adapter 23 and is fixedly attached to an end of the shaft 46b. The second retaining member 46c is disposed on the rear surface 22b of the backplane 22, and is fixedly attached to an opposite end the shaft 46b. Hence, the first fastener 46 fixedly couples the first mounting wing 35, the first support 26, and the backplane 22.

The second fastener 47 likewise may be a nut and bolt, and may comprise a first retaining member 47a, a shaft 47b, and a second retaining member 47c (the member 47c is shown in phantom in FIG. 2). At least a portion of the shaft 47b is disposed within the through holes 33, 42, and 44. The first retaining member 47a is disposed on the top surface 41 of the adapter 23, and is fixedly attached to an end of the shaft 47b. The second retaining member 47c is disposed on the rear surface 22b of the backplane 22, and is fixedly attached to an opposite end the shaft 47b. Thus, the second fastener 47 thus fixedly couples the second mounting wing 36, the second support 27, and the backplane 22.

Most preferably, the shafts 46b and 47b each comprise a threaded rod, the members 46a and 47a are four or six-sided heads fixed to the corresponding threaded rod, and the members 46c and 47c are bolts adapted to engage the threaded rods. (The use of the fasteners 46 and 47 to couple the supports 26 and 27 to the backplane 22 is a preferred methodology. Other fastening means, e.g., mounting tabs, adhesive, soldering, etc., are also within the contemplated scope of the invention.)

Fiber-optic cables 48 and 49 are attached to the connectors 24 and 25, respectively. One end of the cable 48 is disposed along the mating surface 24a of the connector 24, as shown in phantom in FIG. 4. One end of the cable 49 is likewise disposed along the mating surface 25a of the connector 25. The cable 48 has a minimum bending radius 48a. The minimum bending radius 48a typically has a value equal to approximately ten times the diameter of the optical fiber of the cable 48. In the particular embodiment herein described, the cable 48 is routed through the penetration 45 in the backplane 22. The cable 48 thus protrudes from the backplane 22. More particularly, the cable 48 protrudes in a direction normal to the backplane rear surface 22b by a distance 50.

An adjacent structure 51 is shown in FIG. 3 for illustrative purposes. The cable 48 is routed between the backplane 22 and the structure 51 in this exemplary layout. The structure 51 can be virtually any type of structure which is capable of being placed in relatively close proximity to the backplane 22. For example, the structure 51 may be a door of a cabinet in which the backplane 22 is mounted. As another example, the structure 51 may be a printed circuit board which is housed within an electronic device along with the backplane 22. As is evident from FIG. 3, the minimum required clearance between the structure 51 and the backplane 22 corresponds to the cable-protrusion distance 50.

The length of the supports 26 and 27 can be tailored for a suitable cable protrusion distance 50, which could be approximately, or even less than, the minimum bending radius of the cable 48. Specifically, the length of the supports 26 and 27 determines the positions of the adapter 23 and the connectors 24 and 25 in relation to the backplane 22. Preferably, the length of the supports 26 and 27 is sufficient to place the entirety of the connector 24 on the same side of the rear surface 22b as the adapter 23 and the connector 25. This arrangement will exist when the mating surface 24a of the connector 24 is located at a specific minimum distance or greater from the rear surface 22b. This minimum distance could correspond to a length 24d of the connector 24.

FIG. 3 illustrates the relative positions of the connector 24, the cable 48, and the backplane 22 when the mating surface 24a and the rear surface 22b are separated by a distance equal to at least the connector length 24d. Separating the mating surface 24a and the rear surface 22b by at least the connector length 24d eliminates any protrusion of the connector 24 from the rear surface 22b. Hence, a curvature can be imposed on the cable 48 as it exits the rear surface 22b, as shown in FIG. 3. The cable protrusion 50 can be minimized by imposing a curvature equal to the minimum bending radius 48a, and extending this curvature through an arc of at least 90 degrees. In such an arrangement, the protrusion 50 will thus equal approximately the minimum bending radius 48a of the cable 48. Increasing the length of the standoff 21 could decrease the protrusion distance 50 to less than the minimum bending radius 48a. Such a small protrusion distance 50 occurs without imposing a curvature greater than the minimum bending radius 48a.

The invention thus minimizes the amount of space required to route the cable 48 from the backplane 22. In the exemplary layout, the invention allows the backplane 22 and the adjacent structure 51 to be placed in closer proximity than would otherwise be possible, i.e., the minimum required clearance between the backplane 22 and the adjacent structure 51 is reduced through the use of the invention. Such a reduction can facilitate higher component-packaging densities within electronic devices in which the invention is utilized. Such increases, as noted previously, are highly valued due to the strict spacial constraints imposed on contemporary electronic devices. Furthermore, the invention achieves this advantage without compromising the structural or functional integrity of the cable 48.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

What is claimed is:

1. A support for mounting a pair of mating connectors to a circuit substrate, comprising:
    an adapter having a first portion adapted to engage one of said pair of connectors and a second portion adapted to engage the other one of said pair of connectors, said adapter aligning the pair of connectors; and
    a standoff secured to said adapter for maintaining said adapter at a distance from the circuit substrate, said distance being substantially equal to or greater than a length of at least one of said pair of connectors so that a substantial entirety of said pair of connectors is located on one side of said circuit substrate.

2. The support of claim 1, wherein said adapter includes a flange and said standoff engages said flange.

3. A system for use with a fiber-optic cable having a minimum bending radius and a backplane having a first and a second surface, said cable being attached to a fiber-optic connector, said cable being routed from said backplane and between said first surface and an adjacent structure, said system limiting a protrusion of said cable from said backplane in a direction substantially normal to said first surface, said system comprising:

an adapter having an adapter abutment surface; and a support having a first and a second abutment surface, said first abutment surface being coupled to said abutment surface of said adapter, said second abutment surface being coupled to said second surface of said backplane, wherein:
  said fiber-optic connector when mounted in said support will be disposed at a distance from said first surface of said backplane, said distance being at least the length of said connector; and
  wherein at least a portion of said cable will have a curvature at least equal to said minimum bending radius, said curvature extending through an arc of at least 90 degrees, whereby said cable protrusion is about equal to said minimum bending radius and said adjacent structure can be positioned at a distance from said first surface about equal to said minimum bending radius.

4. The system of claim 3, wherein:

said adapter has a second surface;

said adapter has a through hole, said through hole extending between said abutment surface and said second surface of said adapter;

said support has a through hole, said through hole extending between said first and second abutment surfaces of said support; and said system further comprises a fastener, at least a portion of said fastener being disposed within said through holes of said adapter and said support, said fastener fixedly coupling said adapter and said backplane.

5. The system of claim 4, wherein said fastener comprises a shaft, a first retaining member, and a second retaining member, wherein:

said first retaining member is disposed on said second surface of said adapter;

said second retaining member is disposed on said second surface of said backplane; and at least a portion of said shaft is disposed within said through holes of said adapter and said support.

6. A method for use with a fiber-optic cable coupled to a fiber-optic connector, said cable being routed from a backplane having a first and a second surface, said method for limiting a protrusion of said cable from said backplane in a direction substantially normal to said first surface, said method comprising the steps of:

mounting said connector at a distance from said second surface;

routing said cable from said connector through said backplane; and bending a portion of said cable that extends beyond said first surface so that said portion has a curvature at least equal to a minimum bending radius of said cable, said curvature extending through an arc of at least 90 degrees, whereby said cable protrusion is not greater than said minimum bending radius.

7. The method of claim 6, further comprising the step of positioning a substantially planar surface adjacent to said first surface at a distance no greater than said minimum bending radius.

8. A fiber-optic connector system, comprising:

a first cable having a first mating end and at least one optical fiber;

a second cable having a second mating end and at least one optical fiber;

a circuit substrate having an opening therein, said first cable extending through said opening;

an adapter receiving and aligning said first and second mating ends; and a standoff secured to said circuit substrate and said adapter for locating said adapter away from said substrate by a distance substantially equal to or greater than a length of at least one of said first and second mating ends so that a substantial entirety of said first mating end and a substantial entirety of said second mating end are located on a same side of said circuit substrate.

9. The fiber-optic connector system of claim 8, wherein said mating ends of said first and second cables are disposed generally transverse to said circuit substrate.

10. The fiber-optic connector system of claim 8, wherein said first cable includes a curved section having at least a minimum bending radius.

11. The fiber-optic connector system of claim 10, wherein said curved section resides within said opening.

12. A connector system, comprising:

a circuit substrate; and a fiber optic cable assembly mounted to said circuit substrate, including:
  a fiber optic cable, having:
    a first portion with a longitudinal axis;
    a second portion with a longitudinal axis generally transverse to said longitudinal axis of said first portion; and
    a curved portion joining said first and second portions; and
  a connector secured to an end of said first portion of said fiber optic cable, wherein said second portion is spaced a distance from said connector that is greater than a distance between said second portion and said circuit substrate.

* * * * *